Patented Feb. 25, 1941

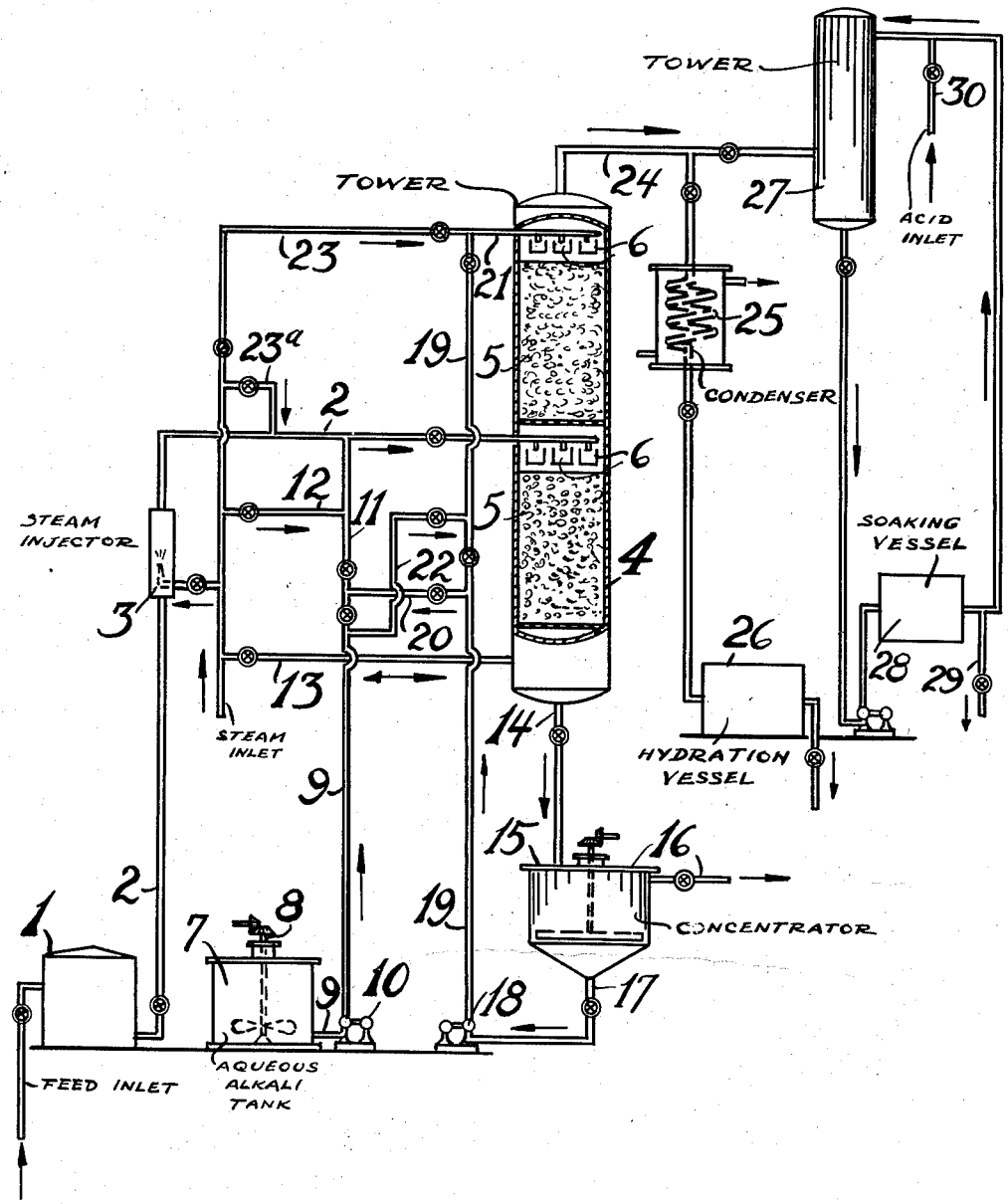

2,232,910

UNITED STATES PATENT OFFICE 2,232,910

CHEMICAL PROCESS

Arthur Donald Green, Cranford, and Wendell W. Waterman, Elizabeth, N. J., assignors to Standard Oil Development Company, a corporation of Delaware Application July 27, 1939, Serial No. 286,754

13 Claims. (Cl. 260—348)

This invention relates to the manufacture of organic oxides, such as ethylene oxide and homologs thereof, from the corresponding olefin halohydrins by the action of an alkali. It relates more particularly to an improved process for carrying out this reaction with substantially increased yields of the desired olefin oxides and in which other advantageous results are obtained.

The reaction involved in this process is illustrated as follows:

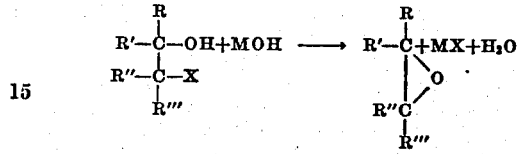

in which R, R', R" and R"' represent organic radicals or hydrogen atoms, M represents an alkali or alkaline earth metal and X represents a halogen.

In this process the olefin halohydrin is passed into a rectification tower and is brought into contact, either before entry into this tower or immediately thereafter, with an alkali. The mixture of reagents passes down the tower countercurrent to a rising current of vapor which serves to strip the olefin oxide out of the liquid phase and to carry it overhead. Additional alkali is supplied to the top of the column and passes downwardly in countercurrent contact with the rising olefin oxide vapors, thereby preventing the carrying overhead of any unreacted halohydrins.

While methods have already been proposed for reacting chlorhydrins with alkalies and distilling off the oxide formed, these methods require either such a long time of contact of reagents that substantial hydrolysis or polymerization of the oxide occurs, or else involve the carrying over of chlorhydrin with resulting impure products containing halogen and with corrosion difficulties in treating such products. The olefine chlorhydrins and water form constant boiling mixtures; for example, ethylene chlorhydrin and water form a constant boiling mixture containing approximately 43 weight per cent of the chlorhydrin. Over solutions of lower concentration the equilibrium ratio of ethylene chlorhydrin to water is higher in the vapor than in the liquid. Consequently, substantial amounts of chlorhydrin are carried out of the distillation zone and this is not prevented by the customary rectification with reflux. Important advantages of the present process are that such losses of olefine oxides and of chlorhydrin are effectively prevented.

The drawing is a diagrammatic illustration in partial sectional elevation of a suitable apparatus for carrying out one modification of this invention and indicates the flow of materials. This drawing will be described in connection with the preparation of ethylene oxide from a dilute aqueous solution of ethylene chlorhydrin by means of lime, although the process illustrated is adapted to the preparation of distillable olefin oxides from olefin halohydrins generally with alkalies.

An aqueous solution of ethylene chlorhydrin is supplied in the feed tank 1. This is preferably a dilute aqueous solution which may be suitably of about 3 to 10% concentration, such as is prepared by passing ethylene into chlorinated water, although the ethylene chlorhydrin solution may be prepared by any other suitable method and may or may not contain free hydrochloric acid. This aqueous chlorhydrin solution is passed by line 2 by either gravity flow or other suitable means, such as the steam injector 3, into the mid section of tower 4 which is suitably a packed tower containing ceramic ring packing 5 and distributing troughs 6 for the feed. The chlorhydrin solution is preferably preheated in line 2 to about the temperature maintained in the tower 5 by any suitable preheater involving direct or indirect heat exchange, such as by the injection of live steam from line 23a.

An aqueous alkali, preferably a slurry of calcium hydroxide, is provided in tank 7 which may be equipped with any suitable agitation means, such as the stirrer 8, and is passed by line 9 pump 10 and line 11 into admixture with the preheated chlorhydrin solution in line 2. The alkali solution is also preferably preheated to about the temperature maintained in the tower 4 by any suitable means involving direct or indirect heat exchange, such as by the injection of live steam from line 12. The dimensions of pipe 2 from the junction with line 11 to the tower 4 are preferably such as to provide good turbulence and an intimate mixing of the chlorhydrin and alkaline solutions. The bottom section of the tower 4 is preferably heated to boil the liquid therein or is supplied with steam or a suitable inert gas such as nitrogen, carbon dioxide, etc. to serve as a stripping agent for the material flowing down the column. This is suitably accomplished, for example, by introducing live steam by pipe 13.

Spent lime slurry is withdrawn from the bottom of the column through line 14 and unreacted alkali is separated from the soluble chloride salts therein by any suitable means and is then recycled to the tower. For example, the spent lime slurry withdrawn in line 14 may be passed to a settler or concentrator 15 from which the supernatant aqueous solution is withdrawn by line 16. The concentrated lime slurry is withdrawn by line 17 and recycled by pump 18 and lines 19 and 20 into the alkali feed line 11.

Additional aqueous alkali is supplied to the top of column 4 by line 21 and may consist either of the recycled alkali from line 19 or of fresh alkali from lines 9 and 22 or a mixture from both sources. The alkali solution in line 21 is also preferably preheated by direct or indirect heat exchange, as by injection of live steam from line 23. Vapors leaving the top of the tower are withdrawn by line 24 and passed to any suitable recovery equipment for the olefin oxide. For example, they may be passed through condenser 25 and into hydration vessel 26 in which the olefin oxide is converted to glycol. A particularly suitable method for converting the olefin oxide to glycol is by passing the vapors in line 24 into a tower 27 in which they are scrubbed countercurrently with an aqueous solution of glycol, suitably a recycled solution of the desired glycol which contains about ½% of a strong mineral acid, such as sulfuric acid, the liquid from the bottom of the tower being passed through a soaking vessel or drum 28 in order to extend the hydration time, and then being recycled to the top of the tower 27. The product is drawn off by the line 29 at such a rate as to prevent the glycol from building up to a concentration above about 10%. Makeup acid and water may be added by the line 30, the total concentration of acid in the circulating liquor being kept preferably below about ½%. Increasing the acid and/or glycol concentration promotes the formation of glycol dehydration products, diethylene glycol being formed from ethylene oxide, or ethylene glycol, for example, under such conditions.

The process described above is also applicable to mixtures of chlorhydrins or other halohydrins, such as the mixtures obtained by treating a mixture of olefins which may consist largely of olefins in a concentrated form or which may also contain hydrocarbons, hydrogen or other relatively inert materials, such as the products obtained on subjecting hydrocarbon oils or gases to cracking and/or dehydrogenation treatments. For example, the cracked normally gaseous or liquid fractions obtained on cracking petroleum oils to gasoline may be treated with chlorinated water or other suitable means, to convert the olefins therein to a mixture of chlorhydrins. Such cracked products may also be fractionated into fractions of any desired boiling range and concentration of olefins, as by suitable distillation or solvent extraction treatments, the resulting olefin-containing fractions then being treated to convert olefins therein to chlorhydrins. As an illustration, the normally gaseous products obtained on cracking heavier petroleum oils to motor fuels may be treated by compression and refrigeration or absorption methods to secure a highly volatile liquid condensate which is practically free of hydrogen but contains substantial proportions of light liquid and normally gaseous hydrocarbons both saturated and unsaturated. A somewhat similar condensate is obtained as overhead from a debutanizer operating on cracked naphthas. Either of these liquefied products may then be subjected to a stabilization treatment to separate the propylene and lighter hydrocarbons from the hydrocarbons boiling in and above the butane-butene range. The total liquefied products, or the lighter fraction may then be treated with sulfuric acid to absorb the major portion of the olefines heavier than ethylene and the remaining unabsorbed fraction from this treatment is then treated with chlorinated water to absorb the ethylene and the remaining propylene therein and to form a dilute aqueous solution containing about 3 to 10% of ethylene and propylene chlorhydrins. The unabsorbed fraction, prior to the treatment with chlorinated water, may also be cracked to increase its content of ethylene and propylene. It may then be subjected to additional treatment to remove olefines of higher molecular weight than propylene, and all or a part of the propylene, prior to the treatment with chlorinated water, or the total cracked gases may be subjected to this treatment. Substantially saturated hydrocarbon gases, such as field gas, or components thereof, such as field propanes, may also be cracked to a gas containing ethylene and propylene, and such gas may be used to prepare a mixture of chlorhydrins from which a mixture of ethylene and propylene glycols may be prepared by the process described herein. This mixture of chlorhydrins, for example, may be supplied as the feed material in tank 1 of the above described drawing, to prepare a mixture of ethylene oxide and propylene oxide.

An important feature of the herein described process is that the olefin oxide is rapidly removed from the mixture of chlorhydrin and alkali in order to prevent hydration, polymerization, and condensation reactions. This is of particular importance in using an alkaline earth hydroxide, such as calcium hydroxide or slaked lime, as this forms complexes with any glycols present, such complexes being very stable and the recovery of glycols therefrom being extremely difficult and expensive. The alkali and the chlorhydrin are accordingly preferably preheated separately and are brought into an intimate mixture either just before passing into the reaction tower 4 or in this tower. In the latter case, the streams of reagents may be admitted separately to the tower. However, it is preferred to mix the streams before entering into the tower as this greatly reduces corrosion which would otherwise occur at the point of entry of the chlorhydrin stream.

This invention may be used in the treatment of olefine halohydrins generally to prepare olefine oxides which are distillable substantially without decomposition. Suitable olefine halohydrins are indicated by the formula

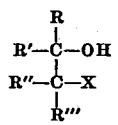

in which R, R', R'', and R''' represent the same or different organic radicals or hydrogen atoms and X represents a halogen, preferably chlorine. The R's may be alkyl or aryl groups, as for example, in propylene chlorhydrin, 1-chloro butanol-2, 1-chloropentanol-2, 1-chloro hexanol-2, styrene chlorhydrin and isomers of such halohydrins. The olefine halohydrins are preferably of 2 to about 8 carbon atoms per molecule, although olefin halohydrins of even higher molecular weight may be used. When the reaction with alkali is conducted in an aqueous medium, it is preferred to use olefin halohydrins whose corresponding oxides boil below, or not substantially above, the boiling point of water. When less volatile olefine oxides are produced, their distillation from the reaction zone in the process described herein may be aided by conducting the reaction under vacuum, by the use of a large proportion of steam or inert gases to reduce the partial pressure of the olefine oxide in the vapor phase, and/or by the use of other liquid reaction media of higher boiling point than water. For example, organic liquids which are inert or react only slowly under the conditions of this process, such as the ethers, may be used in partial or complete substitution for water, and the process may even be carried out under anhydrous conditions, supplying the alkali as a slurry or solution in such anhydrous liquids. Numerous other alkaline compounds can also be used in place of lime in the process of this invention. These include the oxides, hydroxides, carbonates and bicarbonates of the alkali and alkaline earth metals, for example, such as the carbonates and bicarbonates of sodium and potassium and the oxides and hydroxides of calcium. These are considerably more economical than the oxides and hydroxides of the alkali metals, although the latter may also be used. In the use of carbonates, carbon dioxide is liberated and goes overhead with the olefine oxide. When producing gaseous or relatively volatile olefine oxides, such as ethylene oxide, this can be recovered from any gases leaving the column, such as carbon dioxide, or from inert gases passed through the column, by absorption in suitable solvents, such as an aqueous glycol solution.

The application of the present process to the manufacture of ethylene oxide from ethylene chlorhydrin is carried out in an apparatus such as that illustrated in the above described drawing by mixing a dilute ethylene chlorhydrin solution with a portion of the necessary quantity of lime slurry, preferably after preheating each liquid stream separately, and immediately passing the mixture at an intermediate point into a packed column in which it is subjected to the stripping action of steam or in which the oxide is distilled off, preferably under reduced pressure. In the latter case the removal of the oxide may be completed by introducing heat to the liquid accumulating at the base of the tower in the form of either direct or indirect steam. The remainder of the lime is introduced as a slurry at the top of the column for the purpose of removing unreacted chlorhydrin from the oxide vapors. The total amount of lime entering the column is in excess of the quantity theoretically necessary and the unreacted lime is recovered by settling from the calcium chloride solution leaving the column and is recycled. It is in general preferred to mix the ethylene chlorhydrin feed solution continuously with a quantity slightly in excess of the theoretical amount of alkali required for the neutralization of any free hydrochloric acid in the solution and for the conversion of the chlorhydrin to ethylene oxide, additional lime being introduced at the top of the column. This additional lime may suitably be from 200 to 1200% of the theoretical lime requirement, although a smaller excess may be used if the column is very efficient in providing the desired contact of liquid and vapor phases. The column may be operated at any suitable pressure from a vacuum between about 50 and 200 mms. of mercury absolute for example, to superatmospheric pressures. The amount of water distilling over with the oxide is controlled by the amount of steam added directly at the base of the column. The column is operated preferably at a temperature which is approximately the temperature of boiling water under the pressure existing in the column.

This process is also illustrated by the following example: 29.1 gallons of an aqueous chlorhydrin solution containing 0.447 lb. of ethylene chlorhydrin and 0.203 lb. of hydrochloric acid per gallon was passed per hour through a preheater in which it was heated to 82.5° C. and was then mixed with 15 gallons per hour of an aqueous slurry of lime containing 1.41 lbs. of calcium hydroxide per gallon (corresponding to 177% of the amount of lime required theoretically for neutralization of the hydrochloric acid and conversion of the ethylene chlorhydrin to ethylene oxide) and the mixture was passed directly into the middle of a packed column operated at atmospheric pressure with a vapor temperature at the top of 97.6° C. The bottoms withdrawn from the tower were settled to concentrate the lime, and an aqueous solution of calcium chloride together with some unreacted lime was eliminated by decantation. The reconcentrated lime was recycled to the top of the tower at a rate of 90.5 gallons per hour of a slurry containing 1.41 lbs. of calcium hydroxide per gallon (the recycle lime corresponding to 1065% of that theoretically required for the process). The vapors leaving the tower were passed through a condenser in which they were condensed and cooled to 40° C. and there was thus obtained 5.92 gallons per hour of condensate containing a concentration of about 13.2% by weight of ethylene oxide. There was thus obtained a yield of 92.1% of ethylene oxide (based on the amount theoretically possible by complete conversion of the ethylene chlorhydrin used) with 5.9% of the feed chlorhydrin being hydrolyzed to form glycol, 1.2% remaining unreacted and 0.8% unaccounted for. Still higher yields are obtained with more efficient lime scrubbing and steam stripping operations in the upper and lower sections of the tower respectively.

This invention is not to be limited by any specific examples or theoretical explanations presented herein, all such being intended solely for purpose of illustration, as it is desired to claim all novelty in so far as the prior art permits.

We claim:

1. Improved process for the manufacture of an organic oxide comprising passing a mixture of an olefin halohydrin and an alkali into a rectification zone, at a reaction temperature for the generation of olefin oxide vapor from said mixture whereupon olefin oxide and unreacted halohydrin pass upwardly through said rectification zone in the vapor phase, supplying additional alkali to the upper portion of said rectification zone to react with said vaporized halohydrin and withdrawing vaporized olefin oxide substantially free of halohydrin from the top of said rectification zone.

2. Process according to claim 1 in which said olefin halohydrin is ethylene chlorhydrin.

3. Process according to claim 1 in which said olefin halohydrin is ropylene chlorhydrin.

4. Process according to claim 1 in which said olefin halohydrin is a mixture of olefin halohydrins prepared from a mixture of olefins obtained by cracking hydrocarbons.

5. Process according to claim 1 in which said olefin halohydrin is supplied to said rectification zone in aqueous solution.

6. Process according to claim 1 in which said alkali is calcium hydroxide.

7. Process according to claim 1 in which liquid descending to the bottom of said rectification zone is withdrawn and the unreacted alkali present therein is recycled in a liquid medium to said rectification zone.

8. Improved process for the manufacture of an organic oxide comprising passing a mixture of an aqueous solution of an olefin halohydrin having from 2 to about 8 carbon atoms per molecule and an alkali into a rectification zone, maintained at a reaction temperature for the generation of the olefin oxide vapor from said mixture whereupon olefin oxide and unreacted halohydrin pass upwardly through said rectification zone in the vapor phase, supplying additional aqueous alkali to the upper portion of said rectification zone above the point of entry of said halohydrin solution to provide an excess of alkali therein and to react in countercurrent contact with said vaporized halohydrin, withdrawing vaporized olefin oxide substantially free of halohydrin from the top of said rectification zone, and heating the liquid descending into the lower portion of said rectification zone below the point of entry of said halohydrin solution to boiling, thereby generating vapors which pass upwardly in countercurrent contact with the descending liquid phase.

9. Process according to claim 8 in which steam is introduced into the lower portion of said rectification zone below the point of entry of said halohydrin solution and passes upwardly countercurrently to the descending liquid phase.

10. Process according to claim 8 in which the liquid descending to the bottom of said rectification zone is withdrawn, the unreacted alkali present therein is concentrated and returned in an aqueous medium to said upper portion of said rectification zone.

11. Process for preparing ethylene oxide comprising passing a dilute aqueous solution of ethylene chlorhydrin in admixture with an aqueous slurry of lime to the mid portion of a rectification zone maintained at a reaction temperature for the generation of ethylene oxide vapor, passing said mixture downwardly through the lower portion of said rectification zone countercurrent to an ascending current of steam, withdrawing liquid containing unreacted and dissolved calcium hydroxide suspended therein from the bottom of said rectification zone, concentrating said calcium hydroxide into a slurry and passing said slurry into the upper portion of said rectification zone above the point of entry of said chlorhydrin solution whereby vapors passing upwardly from this point pass countercurrently to a descending stream of said calcium hydroxide slurry, maintaining an excess of calcium hydroxide continuously in said reaction zone above that required for complete reaction with said chlorhydrin, and withdrawing a mixture of steam and ethylene oxide vapor substantially free of halogen from the top of said rectification zone.

12. Process according to claim 11 in which said rectification zone is maintained at substantially a temperature corresponding to the boiling point of water at the pressure existing in said rectification zone.

13. Process according to claim 11 in which the said aqueous chlorhydrin solution contains about 3 to 10% of ethylene chlorhydrin.

ARTHUR DONALD GREEN.
WENDELL W. WATERMAN.